No. 744,982. PATENTED NOV. 24, 1903.
C. O. SCHNEIDER.
LENS FOR SPECTACLES OR THE LIKE.
APPLICATION FILED MAY 18, 1903.
NO MODEL.

Attest:
John Enders
M. H. Holmes.

Inventor:
Carl Oscar Schneider,
by Robert Burns
Attorney.

No. 744,982.                                    Patented November 24, 1903.

UNITED STATES PATENT OFFICE.

CARL OSCAR SCHNEIDER, OF CHICAGO, ILLINOIS.

LENS FOR SPECTACLES OR THE LIKE.

SPECIFICATION forming part of Letters Patent No. 744,982, dated November 24, 1903.

Application filed May 18, 1903. Serial No. 157,614. (No model.)

*To all whom it may concern:*

Be it known that I, CARL OSCAR SCHNEIDER, a citizen of the United States of America, and a resident of Chicago, in the county of Cook and State of Illinois, have invented certain new and useful Improvements in Lenses for Spectacles or the Like, of which the following is a specification.

The present invention relates to concave lenses used in spectacles, eyeglasses, and trial-lenses, and has for its object to provide a simple and efficient construction of such class of lenses which is adapted to avoid the usual objectionable and unsightly reflections or rings which appear in the ordinary form of concave spectacle-lens and with which the required concavity is afforded with a minimum amount of glass for a given focus and with a corresponding degree of thinness and lightness, all as will hereinafter more fully appear and be more particularly pointed out in the claims.

Figure 9:
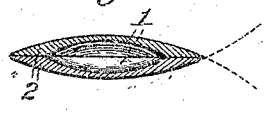
Figure 10:
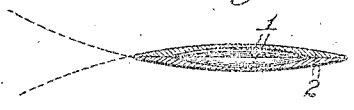
Figure 11:
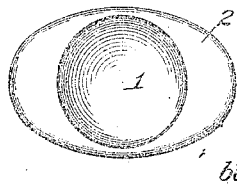

In the accompanying drawings, illustrative of the present invention, Figures 1 to 10, inclusive, are central sections of spectacle or other like lenses embodying the present invention and illustrating various forms of the same. Fig. 11 is an elevation of any one of said lenses.

As heretofore ground concave lenses for spectacles, eyeglasses, and trial-lenses were either double concave, periscopic concave, or plano concave, with the surfaces or both sides ground with their respective curvatures to edges of the lens, except as to a slight marginal bevel for engagement with the holding-frame of the lens. The objections to such construction of concave lenses are that in the stronger numbers the edges of the lenses are quite thick and the weight of the lenses is excessive, with the further and very serious disadvantage that such thickness in the edges causes objectionable and annoying reflections or rings in the concave portions of such lenses.

To qualify, in a measure, the above defects, a lens known to the trade as the "lenticular" spectacle-lens has been employed and in which a flat disk of glass has its central portion ground to the required concavity. Such construction is, however, defective in the same particulars above enumerated, in which the field is quite restricted unless the lens is made quite thick and heavy and in that the opposite surfaces of the lens-body are parallel except for the small concavity at the center, so that the greater portion of the lens is as thick at the edges as at the rim of the central concavity.

As distinguished from the above-described forms of concave lenses for spectacles and the like the present invention consists in forming a concave lens for such uses by grinding a central concave lens or concavity 1 of the desired curvature in a main body portion of the required dimensions, and which body portion is of a double-convex, a plano-convex, or a compound-convex form. As so formed a concave lens for spectacles and like uses is produced containing a much less quantity of glass for a concave lens of a given focus and size than it has been possible to produce heretofore. The present invention also renders it possible to grind a concave lens with thin edges, and thus entirely eliminate the numerous objectionable and annoying reflections or rings which appear in a concave lens of the ordinary form. In addition to the foregoing the present invention affords a lens of a neat and pleasing appearance, and its thinness at the margin permits of a very ready, neat, and substantial attachment to the spectacle-rim or to the straps of a rimless mounting.

Figure 1:
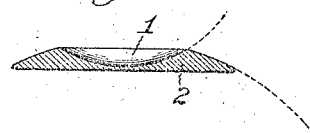
Figure 2:
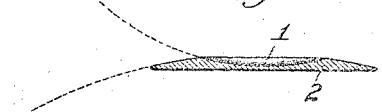
Figure 3:
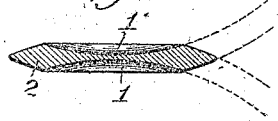
Figure 4:
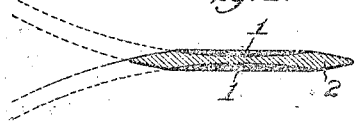
Figure 5:
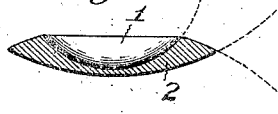
Figure 6:
Figure 7:
Figure 8:
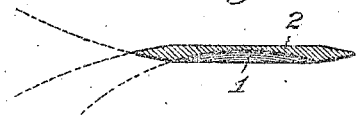

In Figs. 1 and 2 the concave lens or curvature 1 of the present invention is shown as formed on a body portion 2 having a plano-convex or cylindrical form. In Figs. 3 and 4 such concave lens or curvature 1 is shown as formed in both surfaces of a body portion 2 having a double-convex form. In Figs. 5 and 6 such concave lens or curvature 1 is shown as formed in one surface of a body portion 2 having a double-convex form, and as so made affords a periscopic concave lens. In Figs. 7 and 8 such concave lens or curvature 1 is shown as formed in one surface of a body portion 2 having a double-convex form, with the opposite surface having a plane portion corresponding in size to that of the curvature 1 aforesaid. In Figs. 9 and 10 such concave lens or curvature 1 is shown as applied to the flat surfaces of two body portions 2, each of which has a plano-convex form and which are cemented or otherwise secured together in manner shown.

The series of lenses shown in Figs. 1, 3, 5, 7, and 9 are companions to the series of lenses shown in Figs. 2, 4, 6, 8, and 10 and are intended to illustrate in the one series lenses of twenty diopters and in the other series lenses of ten diopters.

Having thus fully described my said invention, what I claim as new, and desire to secure by Letters Patent, is—

1. A concave lens for spectacles and like uses, the same comprising a lens-body portion having a convex form and provided with a central concave curvature, substantially as set forth.

2. A concave lens for spectacles and like uses, the same comprising a lens-body portion having a plano-convex form, and provided with a central concave curvature, substantially as set forth.

3. A concave lens for spectacles and like uses, the same comprising a lens-body portion having a plano-convex form, and provided with a central concave curvature in the convex surface of such body portion, substantially as set forth.

4. A concave lens for spectacles and like uses, the same comprising a lens-body portion having a convex form, and provided with a central concave curvature in one surface, and a flat portion on the other surface corresponding in size to the central curvature aforesaid, substantially as set forth.

Signed at Chicago, Illinois, this 16th day of May, 1903.

CARL OSCAR SCHNEIDER.

Witnesses:
 ROBERT BURNS,
 M. H. HOLMES.